(12) United States Patent
Kato et al.

(10) Patent No.: US 7,946,947 B2
(45) Date of Patent: May 24, 2011

(54) AUTOMATIC TRANSMISSION

(75) Inventors: Takaaki Kato, Anjo (JP); Tsuyoshi Fukaya, Kariya (JP); Takashi Ogawa, Toyohashi (JP); Akihito Hongoya, Akazaki (JP); Hiroyuki Tsukamoto, Chiryu (JP)

(73) Assignee: Aisin AW Co., Ltd., Aichi-ken (JP)

( * ) Notice: Subject to any disclaimer, the term of this patent is extended or adjusted under 35 U.S.C. 154(b) by 683 days.

(21) Appl. No.: 12/038,543

(22) Filed: Feb. 27, 2008

(65) Prior Publication Data

US 2008/0207383 A1 Aug. 28, 2008

(30) Foreign Application Priority Data

Feb. 28, 2007 (JP) .................................. 2007-049956

(51) Int. Cl.
*F16H 3/44* (2006.01)
(52) U.S. Cl. ........................................ 475/282; 475/290
(58) Field of Classification Search .................. 475/271, 475/275, 282, 283, 290, 291, 296, 330
See application file for complete search history.

(56) References Cited

U.S. PATENT DOCUMENTS

| 3,941,013 | A | * | 3/1976 | Miller | 475/276 |
| 4,683,776 | A | * | 8/1987 | Klemen | 475/286 |
| 6,524,208 | B1 | * | 2/2003 | Hollermann et al. | 475/91 |
| 7,163,484 | B2 | * | 1/2007 | Klemen | 475/276 |
| 7,364,527 | B2 | * | 4/2008 | Klemen | 475/290 |
| 2004/0102278 | A1 | * | 5/2004 | Usoro et al. | 475/275 |
| 2006/0019791 | A1 | * | 1/2006 | Baldwin | 475/275 |

FOREIGN PATENT DOCUMENTS

JP 2002-213545 A 7/2002

* cited by examiner

*Primary Examiner* — Roger Pang
(74) *Attorney, Agent, or Firm* — Sughrue Mion, PLLC

(57) ABSTRACT

In single pinion planetary gear mechanisms, a second sun gear is linked to an input shaft in a power-transmissible manner, a first sun gear is linked to a third control brake, and a first carrier and a second ring gear which are linked to each other are linked to a first control brake. In single pinion planetary gear mechanisms, a third sun gear and a fourth sun gear which are linked to each other are linked to the input shaft disengageably by a first control clutch, and a third ring gear and a fourth ring gear are linked to a second control brake and a fourth control brake, respectively. Furthermore, in the single pinion planetary gear mechanisms, a third carrier is linked to the input shaft disengageably by a second control clutch and a fourth carrier is linked to an output shaft.

4 Claims, 17 Drawing Sheets

FIG. 2

| GEAR TEETH NUMBER RATIO | | λ0 0.440 | λ1 0.440 | λ2 0.394 | λ3 0.394 | | | GEAR RATIO | STEP |
|---|---|---|---|---|---|---|---|---|---|
| | C-1 | C-2 | C-3 | B-1 | B-2 | B-3 | B-4 | F-3 | | Rev/1st |
| P | | | | | | | | | - | |
| Rev 1 | | | ○ | ○ | | | ○ | | | |
| Rev 2 | | | ○ | | | | ○ | | | |
| N | | | | | | | | | - | |
| 1st | ○ | | | ● | | | (○) | ○ | 3.5385 | |
| 2nd | ○ | | | ● | | | | | 2.0604 | > 1.717 |
| 3rd | ○ | | ○ | ○ | | | | | 1.5331 | > 1.344 |
| 4th | ○ | | ○ | | | ○ | | | 1.2503 | > 1.226 |
| 5th | ○ | ○ | ● | | | | | | 1.0000 | > 1.250 |
| 6th | | ○ | ○ | | | ○ | | | 0.7818 | > 1.279 |
| 7th | | ○ | ○ | ○ | | | | | 0.6735 | > 1.161 |
| 8th | | ○ | | ● | ○ | | | | 0.5823 | > 1.157 |

(○) : MEANS ENGAGEMENT AT THE TIME OF ENGINE BRAKING.
● : MEANS ENGAGEMENT WITHOUT TORQUE TRANSMISSION.

FIG. 7

| GEAR TEETH NUMBER RATIO | λ0 0.440 | λ1 0.440 | | λ2 0.394 | λ3 0.394 | GEAR RATIO | STEP Rev/1st |
|---|---|---|---|---|---|---|---|
| | C-1 | C-2 | B-1 | B-2 | B-3 | B-4 | F-3 | | |
| P | | | | | | | | - | |
| Rev 1 | | | ○ | | | ○ | | | |
| Rev 2 | | | | ○ | ○ | | | | |
| N | | | | | | | | - | |
| 1st | ○ | | | | | (○) | ○ | 3.5385 | > 1.717 |
| 2nd | ○ | | | ○ | | | | 2.0604 | > 1.344 |
| 3rd | ○ | | ○ | | | | | 1.5331 | > 1.226 |
| 4th | ○ | | | | ○ | | | 1.2503 | > 1.250 |
| 5th | ○ | ○ | | | | | | 1.0000 | > 1.279 |
| 6th | | ○ | ○ | | | | | 0.7818 | > 1.161 |
| 7th | | ○ | | | ○ | | | 0.6735 | > 1.157 |
| 8th | | ○ | | ○ | | | | 0.5823 | |

(○) : MEANS ENGAGEMENT AT THE TIME OF ENGINE BRAKING.

AUTOMATIC TRANSMISSION

TECHNICAL FIELD

The present invention relates to an automatic transmission which transmits rotation of an input shaft to an output shaft while shifting in multiple stages by means of a planetary gear train.

BACKGROUND ART

For example, an automatic transmission disclosed in Patent document 1 (hereinafter referred to as "conventional automatic transmission") is known as an automatic transmission of the above kind. Patent document 1 discloses an automatic transmission which is equipped with a reduction double planetary gear train in which a common sun gear directly connected to an input shaft is in mesh with a first ring gear via a small-diameter pinion of a stepped pinion supported by a carrier and is in mesh with a second ring gear via a large-diameter pinion of the stepped pinion, a shifting double planetary gear train in which a sun gear of a first single pinion planetary gear train and a sun gear of a second single pinion planetary gear train are directly connected to each other and a carrier of the first single pinion planetary gear train and a ring gear of the second single pinion planetary gear train are directly connected to each other, a first clutch for selectively connecting the input shaft to the directly connected sun gears of the shifting double planetary gear train, a second clutch for selectively connecting the input shaft to the directly connected carrier and ring gear of the shifting double planetary gear train, a first brake for selectively fixing the first ring gear of the reduction double planetary gear train, a second brake for selectively fixing the second ring gear of the reduction double planetary gear train, a third brake for selectively fixing the carrier of the reduction double planetary gear train and a ring gear of the first single pinion planetary gear train which are directly connected to each other, a fourth brake for selectively fixing the directly connected carrier and ring gear of the shifting double planetary gear train, and an output shaft which is directly connected to a carrier of the second single pinion planetary gear train. Rotation of the input shaft is transmitted to the output shaft while shifting is made between forward eight shift stages and a backward shift stage.

[Patent document 1] JP-A-2002-213545

DISCLOSURE OF THE INVENTION

Problems to be Solved by the Invention

Incidentally, in such an automatic transmission, the rate of increase of the gear ratio (the rotation speed of the input shaft divided by that of the output shaft) when the shift stage is raised by one stage is called "step ratio." From the viewpoint of obtaining a good shift feeling, it is preferable that the step ratios be allocated to pairs of shift stages without large variations. If the step ratio itself of each pair of shift stages is too small (i.e., close to "1"), at the time of, for example, shifting with acceleration, a rotation speed drop in an effective rotation range of the engine is slight. Therefore, the driver is given only a slight degree of shift feeling and cannot have a sufficient feeling of acceleration at the time of the shifting.

In this respect, in the conventional automatic transmission, the step ratio between the fourth shift stage and the fifth shift stage and the step ratio between the fifth shift stage and the sixth shift stage are much different from the step ratios between the above shift stages and the adjacent, low-speed side and high-speed side shift stages. Furthermore, the step ratio between the sixth shift stage and the seventh shift stage which are as high-speed stages has a small value of less than 1.1 which can hardly provide a shift feeling. Therefore, an automatic transmission having gear ratios of forward eight stages with properly allocated step ratios is desired which can provide a sufficient feeling of acceleration with a clear shift feeling at the time of shifting with acceleration and is thus better than the above conventional automatic transmission.

The present invention has been made in view of the above circumstances, and an object of the invention is therefore to provide an automatic transmission capable of providing a sufficient feeling of acceleration with a clear shift feeling at the time of shifting with acceleration by properly allocating step ratios between shift stages.

Means for Solving the Problems

To attain the above object, the invention recited in a first aspect which relates to an automatic transmission is characterized by comprising a reduction double planetary gear train having a first planetary gear mechanism and a second planetary gear mechanism both being of a single pinion type and a shifting double planetary gear train having a third planetary gear mechanism and a fourth planetary gear mechanism both being of a single pinion type. The invention is further characterized in that in the reduction double planetary gear train, the first planetary gear mechanism comprises a first sun gear, a first carrier which supports a first pinion being in mesh with the first sun gear, and a first ring gear being in mesh with the first pinion, the second planetary gear mechanism comprises a second sun gear, a second carrier which supports a second pinion being in mesh with the second sun gear and is linked to the first ring gear, and a second ring gear which is in mesh with the second pinion and is linked to the first carrier, the second sun gear is linked to an input shaft in a power-transmissible manner, the first sun gear is linked to a third control brake, and the second ring gear and the first carrier are linked to each other and linked to a first control brake; that in the shifting double planetary gear train, the third planetary gear mechanism comprises a third sun gear, a third carrier which supports a third pinion being in mesh with the third gear, and a third ring gear which is in mesh with the third pinion and is linked to the second carrier in a power-transmissible manner, the fourth planetary gear mechanism comprises a fourth sun gear, a fourth carrier which supports a fourth pinion being in mesh with the fourth sun gear, and a fourth ring gear which is in mesh with the fourth pinion and is linked to the third carrier, the third sun gear and the fourth sun gear are linked to each other and linked to the input shaft disengageably by a first control clutch, the third ring gear and the four ring gear are linked to a second control brake and a fourth control brake, respectively, the third carrier is linked to the input shaft disengageably by a second control clutch, and the fourth carrier is linked to an output shaft; and that rotation of the first ring gear and the second carrier is transmitted to the third ring gear.

In the invention recited in the first aspect, step ratios, each of which is a rate of increase of the gear ratio (the rotation speed of the input shaft divided by that of the output shaft) when the shift stage is raised by one stage, are allocated without large variations from one pair of shift stages to another. As for the step ratio values of the respective pairs of shift stages, even the minimum step ratio value is sufficiently separated from "1," that is, larger than "1.1" which is expected to provide a shift feeling. Therefore, since the step ratios between the shift stages are allocated properly, a sufficient feeling of acceleration can be obtained with a clear shift feeling at the time of shifting with acceleration.

The invention recited in claim 2 is characterized in that, in the automatic transmission recited in claim 1, a third control clutch for preventing fast rotation of the first sun gear is further provided.

The invention recited in a second aspect can provide the same workings/advantage as the invention recited in the first aspect. In addition, the invention recited in the second aspect can prevent a phenomenon that the first sun gear rotates very fast in the reverse direction by disengaging the third control clutch at the time of prescribed shifting.

The invention recited in a third aspect is characterized in that, in the automatic transmission recited in the second aspect, the third control clutch selectively links the input shaft to the second sun gear.

The invention recited in the third aspect can provide the same workings/advantages as the invention recited in the second aspect.

The invention recited in claim 4 is characterized in that, in the automatic transmission recited in the second aspect, the third control clutch selectively links the first ring gear and the second carrier to the third ring gear.

The invention recited in a fourth aspect can provide the same workings/advantages as the invention recited in the second aspect.

BRIEF DESCRIPTION OF THE DRAWINGS

FIG. 2 is a table showing how control clutches and control brakes are activated at each shift stage in the first embodiment.

FIG. 7 is a table showing how control clutches and control brakes are activated at each shift stage in the third embodiment.

BEST MODE FOR CARRYING OUT THE INVENTION

Embodiment 1

An automatic transmission according to a first embodiment of the present invention will be described below with reference to FIGS. 1-3.

Figure 1:
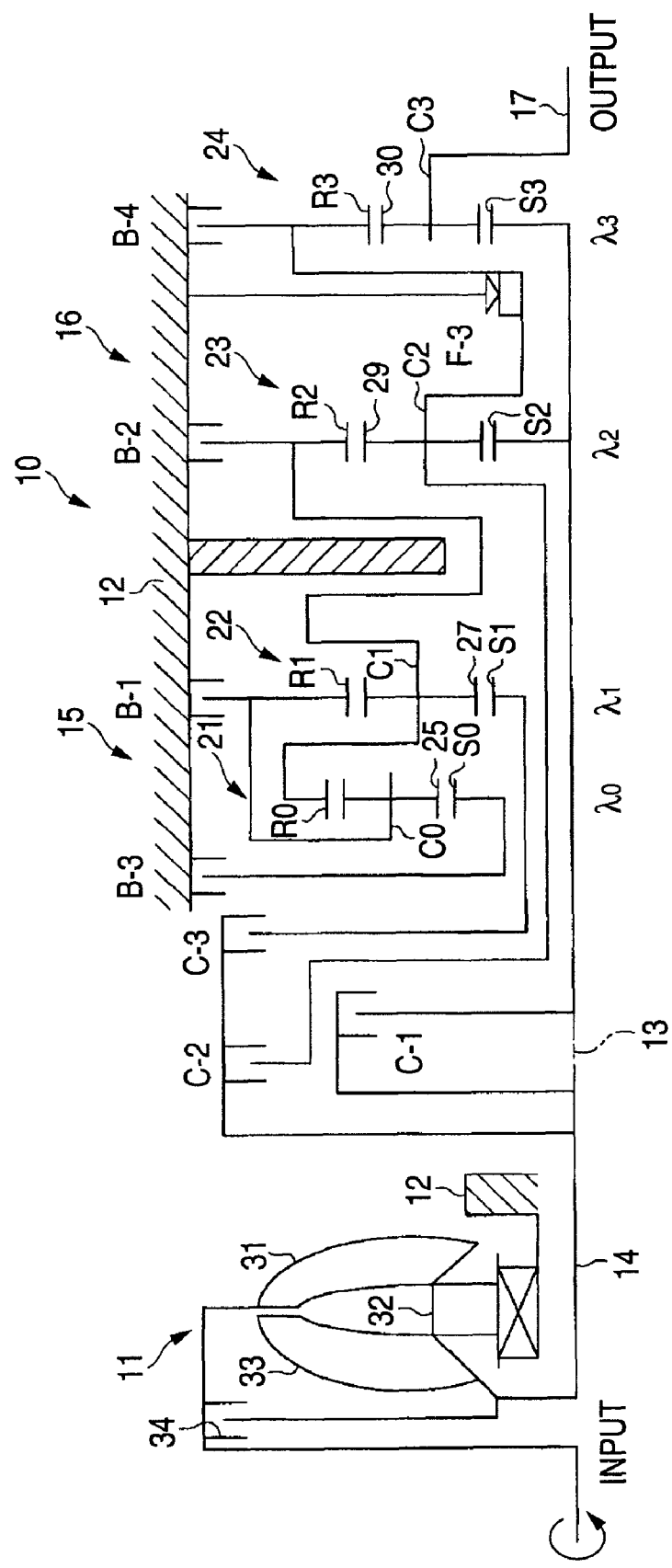
FIG. 1 is a skeleton view of an automatic transmission according to a first embodiment.

FIG. 1 is a skeleton view of an automatic transmission 10 according to the embodiment. This automatic transmission 10 is used for transmitting, to a drive wheel, output rotation of a fluid torque converter 11 which is rotation-driven by an automobile engine, for example, while changing speed. As shown in FIG. 1, the automatic transmission 10 is equipped with a transmission case 12 to be attached to a vehicle body, and an input shaft 14, a reduction double planetary gear train 15, a shifting double planetary gear train 16, and an output shaft 17 which are arranged in this order front to rear (in FIG. 1, left to right) and supported on a common axis 13 which passes through the transmission case 12 approximately down the middle.

As shown in FIG. 1, in the reduction double planetary gear train 15, a single pinion first planetary gear mechanism 21 and a single pinion second planetary gear mechanism 22 are disposed as a front stage and a rear stage, respectively. In the shifting double planetary gear train 16, a single pinion third planetary gear mechanism 23 and a single pinion fourth planetary gear mechanism 24 are disposed as a front stage and a rear stage, respectively.

First, a specific configuration of the reduction double planetary gear train 15 will be described.

In the reduction double planetary gear train 15, the front, first planetary gear mechanism 21 is equipped with a first sun gear S0 which is rotatably supported on the common axis 13, a first carrier C0 which rotatably supports a first pinion 25 being in mesh with the first sun gear S0 and is rotatably supported on the common axis 13, and a first ring gear R0 which is in mesh with the first pinion 25 and is rotatably supported on the common axis 13.

On the other hand, the rear, second planetary gear mechanism 22 is equipped with a second sun gear S1 which is rotatably supported on the common axis 13, a second carrier C1 which rotatably supports a second pinion 27 being in mesh with the second sun gear S1, is linked to the first ring gear R0, and is rotatably supported on the common axis 13, and a second ring gear R1 which is in mesh with and the second pinion 27, is linked to the first carrier C0, and is rotatably supported on the common axis 13.

In the reduction double planetary gear train 15, the second sun gear S1 is linked to the input shaft 14 disengageably by a third control clutch C-3. More specifically, the third control clutch C-3 is provided on a power transmission path capable of transmitting power from the input shaft 14 to the shifting double planetary gear train 16 via the reduction double planetary gear train 15. When the third control clutch C-3 is engaged, the second sun gear S1 is linked to the input shaft 14 in a power-transmissible manner. The first sun gear S0 and the second ring gear R1 are linked to a third control brake B-3 and a first control brake B-1, provided respectively, which are provided in the transmission case 12. When the control brake B-3 or B-1 is activated, rotation of the first sun gear S0 or the second ring gear R1 is restricted.

Next, a specific configuration of the shifting double planetary gear train 16 will be described.

In the shifting double planetary gear train 16, the front, third planetary gear mechanism 23 is equipped with a third sun gear S2 which is rotatably supported on the common axis 13 and a third carrier C2 which rotatably supports a third pinion 29 being in mesh with the third sun gear S2 and is rotatably supported on the common axis 13. The third planetary gear mechanism 23 is also equipped with a third ring gear R2 which is in mesh with the third pinion 29, is linked to the second carrier C1 of the second planetary gear mechanism 22 of the reduction double planetary gear train 15, and is rotatably supported on the common axis 13.

On the other hand, the rear, fourth planetary gear mechanism 24 is equipped with a fourth sun gear S3 which is rotatably supported on the common axis 13 and a fourth carrier C3 which rotatably supports a fourth pinion 30 being in mesh with the fourth sun gear S3 and is rotatably supported on the common axis 13. The fourth planetary gear mechanism 24 is also equipped with a fourth ring gear R3 which is in mesh with the fourth pinion 30, is linked to the third carrier C2 of the front, third planetary gear mechanism 23, and is rotatably supported on the common axis 13.

In the shifting double planetary gear train 16, the third sun gear S2 and the fourth sun gear S3, which are linked to each other, are linked to the input shaft 14 disengageably by a first control clutch C-1. The third carrier C2 and the fourth ring gear R3, which are linked to each other, are linked to the input shaft 14 disengageably by a second control clutch C-2. Rotation of the fourth ring gear R3 and the third carrier C2 of the front, third planetary gear mechanism 23 is restricted in one direction (reverse direction) by a one-way clutch F-3 which is provided in the transmission case 12. The fourth carrier C3 is linked to the output shaft 17. The third ring gear R2 and the fourth ring gear R3 are linked to a second control brake B-2 and a fourth control brake B-4, respectively, which are provided in the transmission case 12. When the control brake B-2 or B-4 is activated, rotation of the third ring gear R2 or the fourth ring gear R3 is restricted.

In the fluid torque converter 11 shown in FIG. 1, a pump impeller 31 is rotation-driven by an engine (not shown) and thereby sends out oil. A stator 32 receives reaction force of the oil, whereby torque is generated in a turbine 33. When a lock-up clutch 34 is activated, the pump impeller 31 is directly connected to the turbine 33 via the lock-up clutch 34. Also in this case, torque is generated in the turbine 33. Since the input shaft 14 is linked to the turbine 33, power is transmitted from the input shaft 14 side to the output shaft 17 via one of the plural power transmission paths.

In the automatic transmission 10 having the above configuration, gear ratios of forward eight stages and backward two stages are realized in such a manner that the first to third control clutches C-1 to C-3 and the first to fourth control brakes B-1 to B-4 are engaged/disengaged or activated selectively and rotation of the individual elements (sun gears, ring gears, etc.) of the reduction double planetary gear train 15 and the shifting double planetary gear train 16 is thereby restricted. Therefore, how the first to third control clutches C-1 to C-3 and the first to fourth brakes B-1 to B-4 are activated at each of the shift stages (forward eight stages and backward two stages) when the automatic transmission 10 is shifted will be described below with reference to FIG. 2.

FIG. 2 is a table showing manners of activation of the control clutches etc. at each shift stage and also showing, on the right part of the table, gear ratios (the rotation speed of the input shaft 14 divided by that of the output shaft 17) at the respective shift stages and step ratios which are rates of increase of the gear ratio when the shift stage is raised by one stage (i.e., the gear ratio of the shift stage concerned divided by that of the preceding stage). In the activation table of FIG. 2, each white circle shown at a space corresponding to a combination of a shift stage and a control clutch or a control brake indicates an engaged state (control clutch) or a rotation-restricted state (control brake). However, as noted under the activation table, a parenthesized white circle indicates that the corresponding control clutch or control brake is in an engaged state or a rotation-restricted state at the time of engine braking. A black circle indicates that the corresponding control clutch or control brake is engaged but is not involved in torque transmission (power transmission).

In each of the single pinion planetary gear mechanisms 21-24 of the reduction double planetary gear train 15 and the shifting double planetary gear train 16, the relationship among the rotation speed Ns of the sun gear, the rotation speed Nc of the carrier, the rotation speed Nr of the ring gear, and the gear teeth number ratio $\lambda$ (the number of teeth of the sun gear divided by that of the ring gear) is given by the following Equation (1). The gear ratio at each shift stage is calculated according to Equation (1).

$$Nr=(1-\lambda)Nc+\lambda Ns \tag{1}$$

Let Zs0, Zs1, Zs2, and Zs3 represent the numbers of teeth of the respective sun gears S0, S1, S2, and S3 and Zr0, Zr1, Zr2, and Zr3 represent the numbers of teeth of the respective ring gears R0, R1, R2, and R3; then, the planetary gear mechanisms 21-24 of the reduction double planetary gear train 15 and the shifting double planetary gear train 16 have gear teeth number ratios $\lambda 0=Zs0/Zr0$, $\lambda 1=Zs1/Zr1$, $\lambda 2=Zs2/Zr2$, and $\lambda 3=Zs3/Zr3$, respectively. The table of FIG. 2 shows, in its top part, the thus-defined gear teeth number ratios $\lambda 0$, $\lambda 1$, $\lambda 2$, and $\lambda 3$ of the respective planetary gear mechanisms 21-24.

Figure 3:
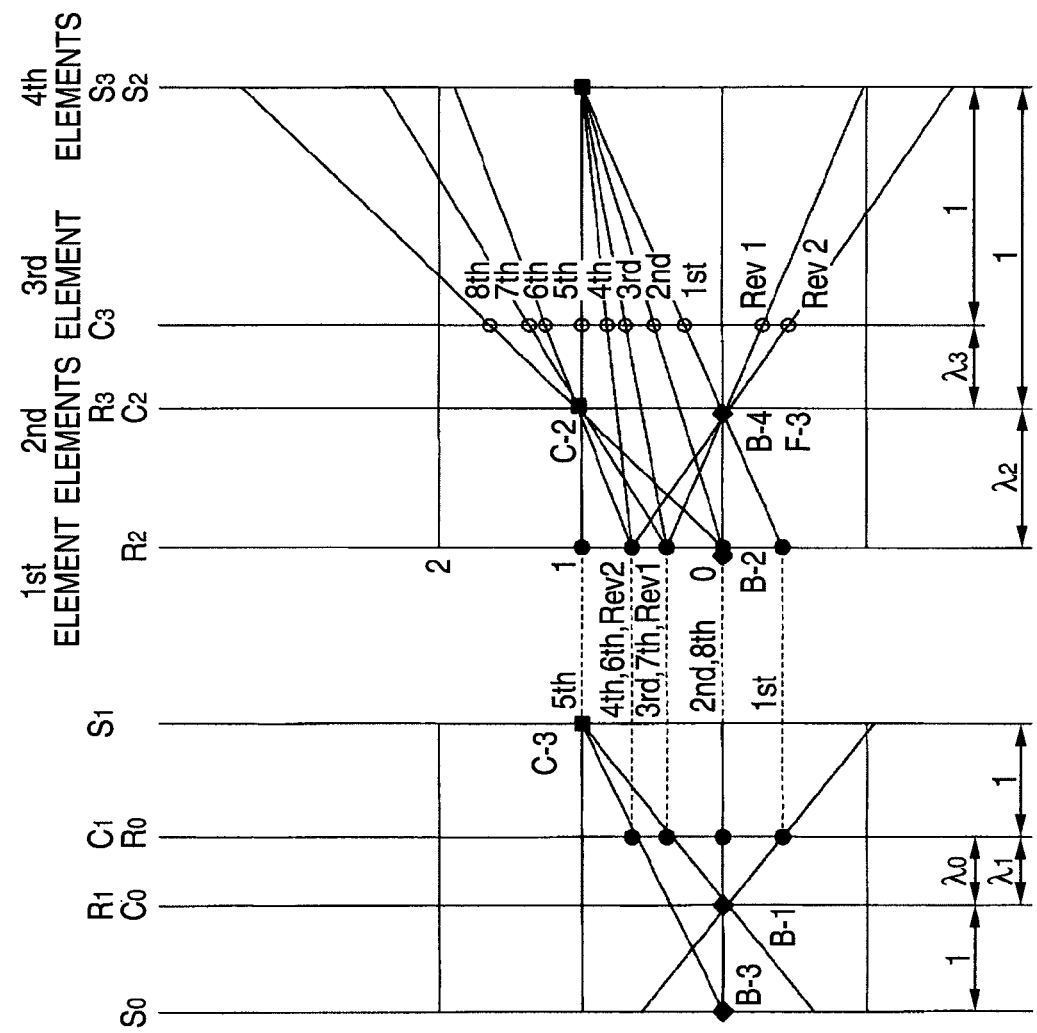
FIG. 3 is a speed diagram showing gear ratios of respective elements of planetary gear trains at each shift stage in the first embodiment.

In the thus-configured automatic transmission 10, when the control clutches C-1 to C-3 and the control brakes B-1 to B-4 are engaged/disengaged or activated selectively according to the activation table of FIG. 2, the speed ratios between the elements (sun gears, ring gears, etc.) of the planetary gear mechanisms 21-24 of the planetary gear trains 15 and 16 become as shown in a speed diagram of FIG. 3. More specifically, this speed diagram is such that the elements which are the sun gears S0-S3, the carriers C0-C3, and the ring gears R0-R3 of the planetary gear trains 15 and 16 are arranged in the horizontal direction at intervals corresponding to the gear teeth number ratios $\lambda 0$-$\lambda 3$, and their speed ratios are shown in the vertical direction corresponding to the respective elements. In the speed diagram of FIG. 3, speed diagrams of the reduction double planetary gear train 15 and the shifting double planetary gear train 16 are juxtaposed in the right-left direction.

First, in the left-hand speed diagram of the reduction double planetary gear train 15, since the second ring gear R1 and the first carrier C0 are linked to each other and operate together, their speed ratios are shown on a single vertical line that is associated with symbols R1 and C0. Likewise, since the second carrier C1 and the first ring gear R0 are linked to each other and operate together, their speed ratios are shown on a single vertical line that is associated with symbols C1 and R0. The speed ratios of the first sun gear S0 and the second sun gear S1 are shown on single vertical lines that are associated with symbols S0 and S1, respectively. In each of the first planetary gear mechanism 21 and the second planetary gear mechanism 22 which are both of the single pinion type, the interval between the vertical line of the carrier C0 or C1 and the vertical line of the sun gear S0 or S1 is regarded as "1." And the vertical line of the ring gear R0 or R1 is located on the opposite side of the vertical line of the carrier C0 or C1 to the vertical line of the sun gear S0 or S1 so as to be spaced from the vertical line of the carrier C0 or C1 by the interval corresponding to the gear teeth number ratio λ0 or λ1.

On the other hand, in the right-hand speed diagram of the shifting double planetary gear train 16, since the fourth ring gear R3 and the third carrier C2 are linked to each other and operate together, their speed ratios are shown on a single vertical line that is associated with symbols R3 and C2. Likewise, since the fourth sun gear S3 and the third sun gear S2 are linked to each other and operate together, their speed ratios are shown on a single vertical line that is associated with symbols S3 and S2. The speed ratios of the third ring gear R2 and the fourth carrier C3 are shown on single vertical lines that are associated with symbols R2 and C3, respectively. In each of the third planetary gear mechanism 23 and the fourth planetary gear mechanism 24 which are both of the single pinion type, the interval between the vertical line of the carrier C2 or C3 and the vertical line of the sun gear S2 or S3 is regarded as "1." And the vertical line of the ring gear R2 or R3 is located on the opposite side of the vertical line of the carrier C2 or C3 to the vertical line of the sun gear S2 or S3 so as to be spaced from the vertical line of the carrier C2 or C3 by the interval corresponding to the gear teeth number ratio λ2 or λ3.

In the speed diagram of FIG. 3, symbols B-1 to B-4 and C-1 to C-3 are attached to points where the first to fourth control brakes B-1 to B-4 and the first to third control clutches C-1 to C-3 are activated selectively. Power transmission paths at the respective shift stages are shown between the left-hand speed diagram of the reduction double planetary gear train 15 and the right-hand speed diagram of the shifting double planetary gear train 16 by connecting, by a broken line, elements that correspond to each other when power is transmitted at each shift stage.

In the right-hand speed diagram of the shifting double planetary gear train 16, the elements corresponding to the four vertical lines are referred to as first, second, third, and fourth elements, respectively, in order of arrangement of the vertical lines. The third ring gear R2 as the first element is linked to the second carrier C1 of the reduction double planetary gear train 15. The fourth ring gear R3 and the third carrier C2 which are linked to each other as the second elements are linked, in parallel, to the second control clutch C-2 and the fourth control brake B-4 in a state that their rotation in one direction (reverse direction) is restricted by the one-way clutch F-3. The fourth carrier C3 as the third element is linked to the output shaft 17. The fourth sun gear S3 and the third sun gear S2 as the fourth elements are linked to the input shaft 14 disengageably by the first control clutch C-1 in a state that they are linked to each other.

Next, how the above-configured automatic transmission 10 operates at each shift stage will be described with reference to FIG. 2 with attention paid to manners of activation at the time of shifting.

First, in the case of the forward first shift stage, the third sun gear S2 and the fourth sun gear S3 are connected to the input shaft 14 because of activation of the first control clutch C-1, whereby rotation of the input shaft 14 is transmitted to the third sun gear S2 and the fourth sun gear S3. In this case, since reverse driving of the fourth ring gear R3 is restricted because of activation of the one-way clutch F-3, the fourth pinion 30 which is in mesh with the fourth sun gear S3 makes an orbital movement with reaction force supported by the reverse-driving-restricted fourth ring gear R3. And the fourth carrier C3 as the third element rotates which supports the fourth pinion 30. As a result, the output shaft 17 which is linked to the fourth carrier C3 is driven in the normal direction at a gear ratio 3.5385 of the forward first shift stage (see FIG. 2). At the time of engine braking, the one-way clutch F-3 rotates idly and cannot restrict reverse driving of the fourth ring gear R3. In this case, the fourth control brake B-4 is activated to restrict rotation of the fourth ring gear R3, whereby the fourth pinion 30 is allowed to make an orbital movement and the fourth carrier C3 and the output shaft 17 rotate.

Next, in the case of the forward second shift stage, the third sun gear S2 and the fourth sun gear S3 are connected to the input shaft 14 because of activation of the first control clutch C-1, whereby rotation of the input shaft 14 is transmitted to the third sun gear S2 and the fourth sun gear S3. In this case, since rotation of the third sun gear R2 is restricted because of activation of the second control brake B-2, the third pinion 29 which is in mesh with the third sun gear S2 makes an orbital movement with reaction force supported by the third ring gear R2 and thereby rotates the third carrier C2 and the fourth ring gear R3. As a result, the fourth pinion 30 makes an orbital movement according to the difference between rotation speeds of the fourth ring gear R3 and the fourth sun gear S3. And the fourth carrier C3 as the third element rotates which supports the fourth pinion 30, whereby the output shaft 17 which is linked to the fourth carrier C3 is driven in the normal direction at a gear ratio 2.0604 of the forward second shift stage (see FIG. 2).

Next, in the case of the forward third shift stage, the third sun gear S2 and the fourth sun gear S3 are connected to the input shaft 14 because of activation of the first control clutch C-1, whereby rotation of the input shaft 14 is transmitted to the third sun gear S2 and the fourth sun gear S3. Furthermore, the second sun gear S1 is connected to the input shaft 14 because of activation of the third control clutch C-3, whereby the rotation of the input shaft 14 is also transmitted to the second sun gear S1. In this case, since rotation of the second ring gear R1 and the first carrier C0 which are linked to each other is restricted because of activation of the first control brake B-1, as the second sun gear S1 rotates the second pinion 27 makes an orbital movement with reaction force supported by the second ring gear R1. And the second carrier C1 which rotatably supports the second pinion 27 rotates together with the third ring gear R2 which is linked to the second carrier C1.

As a result, the third pinion 29 makes an orbital movement according to the difference between rotation speeds of the third ring gear R2 and the third sun gear S2 and thereby rotates the third carrier C2 and the fourth ring gear R3. The fourth pinion 30 makes an orbital movement according to the difference between rotation speeds of the fourth ring gear R3 and the fourth sun gear S3. And the fourth carrier C3 as the third element rotates which supports the fourth pinion 30, whereby the output shaft 17 which is linked to the fourth carrier C3 is driven in the normal direction at a gear ratio 1.5331 of the forward third shift stage (see FIG. 2).

Next, in the case of the forward fourth shift stage, the third sun gear S2 and the fourth sun gear S3 are connected to the input shaft 14 because of activation of the first control clutch C-1, whereby rotation of the input shaft 14 is transmitted to the third sun gear S2 and the fourth sun gear S3. Furthermore, the second sun gear S1 is connected to the input shaft 14 because of activation of the third control clutch C-3, whereby the rotation of the input shaft 14 is also transmitted to the second sun gear S1. In this case, since rotation of the first sun gear S0 is restricted because of activation of the third control brake B-3, as the second sun gear S1 rotates the second ring gear R1 which is in mesh with the second pinion 27 which is supported by the second carrier C1 rotates together with the first carrier C0 which is linked to the second ring gear R1. And the first pinion 25 which is supported rotatably by the first carrier C0 makes an orbital movement.

As a result, the first ring gear R0 which is in mesh with the first pinion 25 rotates together with the second carrier C1 which is linked to the first ring gear R0 and the third ring gear R2 which is linked to the second carrier C1 with reaction force supported by the first sun gear S0. And the third pinion 29 makes an orbital movement according to the difference between rotation speeds of the third ring gear R2 and the third sun gear S2. As the third pinion 29 makes an orbital movement, the third carrier C2 and the fourth ring gear R3 rotate, whereby the fourth pinion 30 makes an orbital movement according to the difference between rotation speeds of the fourth ring gear R3 and the fourth sun gear S3. And the fourth carrier C3 as the third element rotates which supports the fourth pinion 30. As a result, the output shaft 17 which is linked to the fourth carrier C3 is driven in the normal direction at a gear ratio 1.2503 of the forward fourth shift stage (see FIG. 2).

Next, in the case of the forward fifth shift stage, the third sun gear S2 and the fourth sun gear S3 are connected to the input shaft 14 because of activation of the first control clutch C-1, whereby rotation of the input shaft 14 is transmitted to the third sun gear S2 and the fourth sun gear S3. Furthermore, the third carrier C2 and the fourth ring gear R3 which are linked to each other are connected to the input shaft 14 because of activation of the second control clutch C-2, whereby the rotation of the input shaft 14 is also transmitted to the third carrier C2 and the fourth ring gear R3. As a result, the fourth carrier C3 as the third element which supports the fourth pinion 30 which is in mesh with the fourth sun gear S3 and the fourth ring gear R3 rotates together, whereby the output shaft 17 which is linked to the fourth carrier C3 is driven in the normal direction at a gear ratio 1.0000 of the forward fifth shift stage (see FIG. 2).

Next, in the case of the forward sixth shift stage, the third carrier C2 and the fourth ring gear R3 which are linked to each other are connected to the input shaft 14 because of activation of the second control clutch C-2, whereby rotation of the input shaft 14 is transmitted to the third carrier C2 and the fourth ring gear R3. Furthermore, the second sun gear S1 is connected to the input shaft 14 because of activation of the third control clutch C-3, whereby the rotation of the input shaft 14 is also transmitted to the second sun gear S1. In this case, since rotation of the first sun gear S0 is restricted because of activation of the third control brake B-3, as the second sun gear S1 rotates the second ring gear R1 which is in mesh with the second pinion 27 which is supported by the second carrier C1 rotates together with the first carrier C0 which is linked to the second ring gear R1. And the first pinion 25 which is supported rotatably by the first carrier C0 makes an orbital movement.

As a result, the first ring gear R0 which is in mesh with the first pinion 25 rotates together with the second carrier C1 which is linked to the first ring gear R0 and the third ring gear R2 which is linked to the second carrier C1 with reaction force supported by the first sun gear S0. And the third pinion 29 makes an orbital movement according to the difference between rotation speeds of the third ring gear R2 and the third sun gear S2. As the third pinion 29 makes an orbital movement, the third carrier C2 and the fourth ring gear R3 rotate, whereby the fourth pinion 30 makes an orbital movement according to the difference between rotation speeds of the fourth ring gear R3 and the fourth sun gear S3. And the fourth carrier C3 as the third element rotates which supports the fourth pinion C3. As a result, the output shaft 17 which is linked to the fourth carrier C3 is driven in the normal direction at a gear ratio 0.7818 of the forward sixth shift stage (see FIG. 2).

Next, in the case of the forward seventh shift stage, the third carrier C2 and the fourth ring gear R3 which are linked to each other are connected to the input shaft 14 because of activation of the second control clutch C-2, whereby rotation of the input shaft 14 is transmitted to the third carrier C2 and the fourth ring gear R3. Furthermore, the first sun gear S0 and the second carrier C1 are connected to the input shaft 14 because of activation of the third control clutch C-3, whereby the rotation of the input shaft 14 is also transmitted to the first sun gear S0 and the second carrier C1. In this case, since rotation of the second ring gear R1 and the first carrier C0 which are linked to each other is restricted because of activation of the first control brake B-1, as the second sun gear S1 rotates the second pinion 27 makes an orbital movement with reaction force supported by the second ring gear R1. And the second carrier C1 which supports the second pinion 27 rotatably rotates together with the third ring gear R2 which is linked to the second carrier C1.

As a result, the third sun gear S2 rotates together with the fourth sun gear S3 which is linked to the third sun gear S2 according to the difference between rotation speeds of the third ring gear R2 and the third carrier C2. The fourth pinion 30 makes an orbital movement according to the difference between rotation speeds of the fourth sun gear S3 and the fourth ring gear R3. And the fourth carrier C3 as the third element rotates which supports the fourth pinion 30. As a result, the output shaft 17 which is linked to the fourth carrier C3 is driven in the normal direction at a gear ratio 0.67535 of the forward seventh shift stage (see FIG. 2).

Next, in the case of the forward eighth shift stage, the third carrier C2 and the fourth ring gear R3 which are linked to each other are connected to the input shaft 14 because of activation of the second control clutch C-2, whereby rotation of the input shaft 14 is transmitted to the third carrier C2 and the fourth ring gear R3. In this case, since rotation of the third ring gear R2 is restricted because of activation of the second control brake B-2, the third sun gear S2 rotates together with the fourth sun gear S3 which is linked to the third sun gear S2. The fourth pinion 30 makes an orbital movement according to the difference between rotation speeds of the fourth sun gear S3 and the forth ring gear R3. And the fourth carrier C3 as the third element rotates which supports the fourth pinion 30. As a result, the output shaft 17 which is linked to the fourth carrier C3 is driven in the normal direction at a gear ratio 0.5823 of the forward eighth shift stage (see FIG. 2).

Next, in the case of the backward first shift stage, the second sun gear S1 is connected to the input shaft 14 because of activation of the third control clutch C-3, whereby rotation of the input shaft 14 is transmitted to the second sun gear S1. In this case, since rotation of the second ring gear R1 and the first carrier C0 which are linked to each other is restricted because of activation of the first control brake B-1, as the second sun gear S1 rotates the second pinion 27 makes an orbital movement with reaction force supported by the second ring gear R1. And the second carrier C1 which rotatably supports the second pinion 27 rotates together with the third ring gear R2 which is linked to the second carrier C1. In this case, since rotation of the fourth ring gear R3 and the third carrier C2 which are linked to each other is restricted because of activation of the fourth control brake B-4, the third sun gear S2 is rotated in the reverse direction via the third pinion 29 which is supported by the third carrier C2, together with the fourth sun gear S3 which is linked to the third sun gear S2. As a result, the fourth pinion 30 which is in mesh with the fourth sun gear S3 makes an orbital movement with reaction force supported by the fourth ring gear R3. And the fourth carrier C3 as the third element rotates which supports the fourth pinion 30. As a result, the output shaft 17 which is linked to the fourth carrier C3 is driven in the reverse direction at a prescribed gear ratio of the backward first shift stage.

Next, in the case of the backward second shift stage, the second sun gear S1 is connected to the input shaft 14 because of activation of the third control clutch C-3, whereby rotation of the input shaft 14 is transmitted to the second sun gear S1. In this case, since rotation of the first sun gear S0 is restricted because of activation of the third control brake B-3, as the second sun gear S1 rotates the second ring gear R1 which is in mesh with the second pinion 27 which is supported by the second carrier C1 rotates together with the first carrier C0 which is linked to the second ring gear R1. And the first pinion 25 which is rotatably supported by the first carrier C0 makes an orbital movement. As a result, the first ring gear R0 which is in mesh with the first pinion 25 rotates with reaction force supported by the first sun gear S0 together with the second carrier C1 which is linked to the first ring gear R0 and the third ring gear R2 which is linked to the second carrier C1.

In this case, since rotation of the fourth ring gear R3 and the third carrier C2 which are linked to each other is restricted because of activation of the fourth control brake B-4, the third sun gear S2 is rotated in the reverse direction via the third pinion 29 which is supported by the third carrier C2, together with the fourth sun gear S3 which is linked to the third sun gear S2. As a result, the fourth pinion 30 which is in mesh with the fourth sun gear S3 makes an orbital movement with reaction force supported by the fourth ring gear R3. And the fourth carrier C3 as the third element rotates which supports the fourth pinion 30. As a result, the output shaft 17 which is linked to the fourth carrier C3 is driven in the reverse direction at a prescribed gear ratio of the backward second shift stage.

In the above-described forward first shift stage, the third ring gear R2 rotates in the reverse direction as the third sun gear S2 rotates. And the second carrier C1 and the first ring gear R0 which are linked to the third ring gear R2 also rotate in the reverse direction. Therefore, where the third control clutch C-3 were not provided, the rotation of the input shaft 14 would also be transmitted to the second ring gear R1 and the first carrier C0 which is linked to the second ring gear R1 via the second pinion 27 which is supported by the second carrier C1 and the first carrier C0 would rotate. As a result, a large rotation speed difference occurs between the first ring gear R0 and the first carrier C0, whereby the first sun gear S0 which is in mesh with the first pinion 25 which is supported by the first carrier C0 would rotate very fast. In contrast, in the automatic transmission 10 according to the embodiment, since the third control clutch C-3 is provided and disengaged at the forward first shift stage, the above-mentioned phenomenon that the first sun gear S0 rotates very fast can be avoided.

The automatic transmission 10 according to the embodiment operates with the above-described manners of activation at each shift stage, and the rotation speed ratios of the sun gears S0-S3, the carriers C0-C3, and the ring gears R0-R3 at each shift stage are as shown in the speed diagram of FIG. 3 in which the rotation speed of the input shaft 14 is assumed to be "1." Therefore, as seen from the speed diagram of FIG. 3, the rotation speed ratios of the fourth carrier C3 as the third element, that is, the gear ratios, at the respective shift stages are arranged at proper intervals without large variations. As a result, gear ratios of forward eight stages and backward two stages can be realized which are separated from each other properly.

Furthermore, as shown in FIG. 2, the step ratio, which is a rate of increase of the gear ratio when the shift stage is raised by one stage, is equal to 1.717 between the first and second shift stages, 1.344 between the second and third shift stages, 1.226 between the third and fourth shift stages, 1.250 between the fourth and fifth shift stages, 1.279 between the fifth and sixth stages, 1.161 between the sixth and seventh stages, and 1.157 between the seventh and eighth stages. That is, the step ratios are also allocated without large variations from one pair of shift stages to another. As for the step ratio values of the respective pairs of shift stages, even the minimum step ratio value which is between the sixth and seventh shift stages is as large as 1.161.

Therefore, the automatic transmission 10 according to the embodiment can provide the following advantages:

(1) The step ratios of the respective pairs of shift stages of the forward eight stages are allocated without large variations from one pair of shift stages to another. As for the step ratio values of the respective pairs of shift stages, even the minimum step ratio value which is between the sixth and seventh shift stages is as large as 1.161, which is sufficiently separated from "1," that is, larger than "1.1" which is expected to provide a shift feeling. Therefore, since the step ratios between the shift stages are allocated properly, a sufficient feeling of acceleration can be obtained with a clear shift feeling at the time of shifting with acceleration.

(2) At the forward first shift stage, the third control clutch C-3 is disengaged and hence the first carrier C0 and the first ring gear R0 do not rotate with a large difference in rotation speed. Therefore, a phenomenon that the first sun gear S0 which is in mesh with the first pinion 25 which is supported by the first carrier C0 rotates very fast in the reverse direction can be avoided.

(3) In the transmission case 12, the third control clutch C-3 can be disposed on the front side of the planetary gear trains 15 and 16. This makes it possible to form an oil passage inside the input shaft 14 which goes along the common axis 13 and to supply operation oil to the third control clutch C-3 via this oil passage. It thus becomes easier to secure an oil passage for supply of operation oil to the third control clutch C-3.

Embodiment 2

Next, an automatic transmission according to a second embodiment of the invention will be described with reference to FIGS. 4 and 5. The second embodiment is the same in configuration as the first embodiment except for the location of the third control clutch. Therefore, in the following, features that are different than in the first embodiment will be described mainly and redundant descriptions will be avoided by giving members etc. having the same members etc. in the first embodiment the same reference symbols as the latter.

Figure 4:
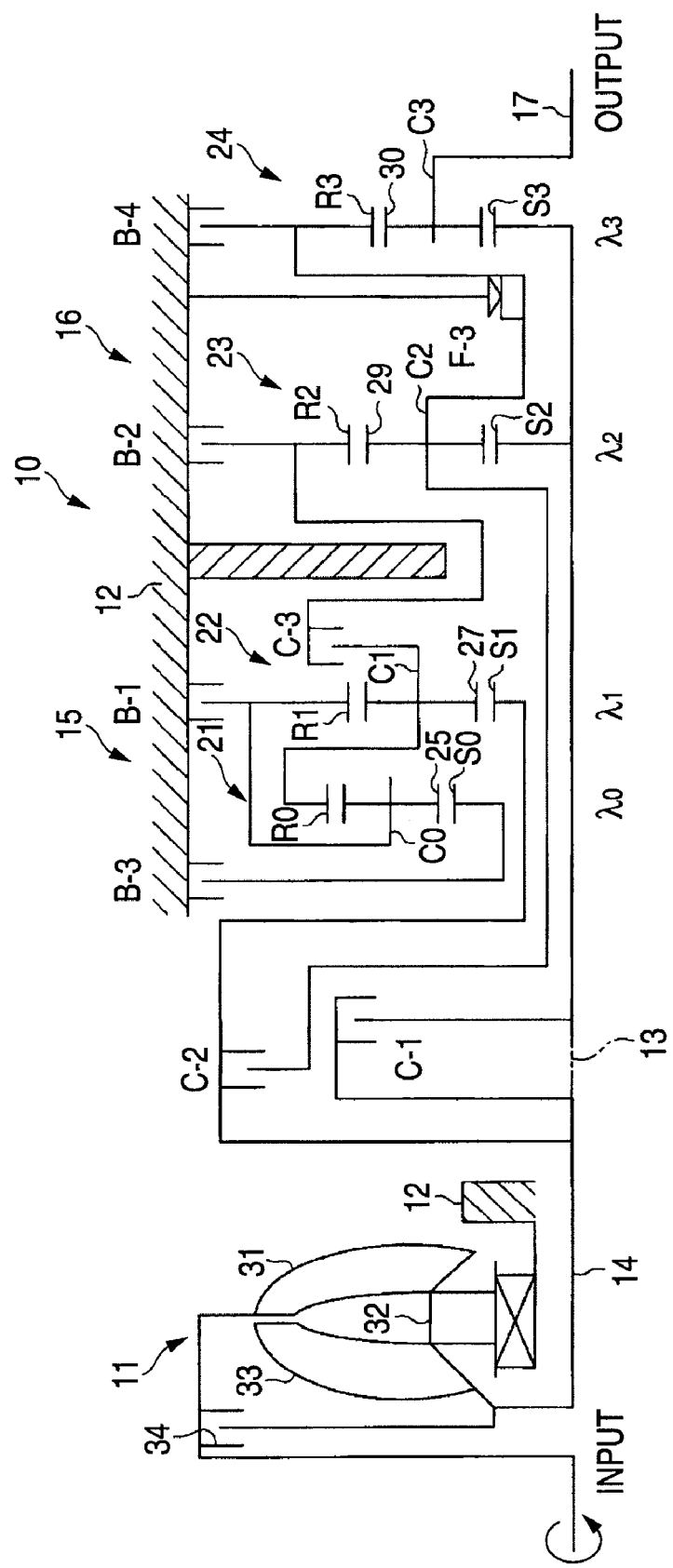
FIG. 4 is a skeleton view of an automatic transmission according to a second embodiment.

In the automatic transmission 10 according to this embodiment, as shown in FIG. 4, the second sun gear S1 of the second planetary gear mechanism 22 of the reduction double planetary gear train 15 is connected to the input shaft 14, whereby rotation of the input shaft 14 is transmitted to the second sun gear S1. On the other hand, the first ring gear R0 of the first planetary gear mechanism 21 and the second carrier C1 of the second planetary gear mechanism 22 which are linked to each other in the reduction double planetary gear train 15 are linked disengageably to the third ring gear R2 of the third planetary gear mechanism 23 of the shifting double planetary gear train 16 by the third control clutch C-3. As shown in FIG. 4, in the other points, the members of the automatic transmission 10 according to the second embodiment are the same as those of the automatic transmission 10 according to the first embodiment.

In the second embodiment, as in the case of the first embodiment, the manners of activation at each shift stage are as shown in the activation table of FIG. 2. More specifically, at each of the forward third shift stage, the forward fourth shift stage, the forward sixth shift stage, and the forward seventh shift stage, the third control clutch C-3 is activated, as a result of which the first ring gear R0 and the second carrier C1 which are linked to each other are connected to the third ring gear R2. Although the third control clutch C-3 is engaged also at the forward fifth shift stage, it is not involved in torque (power) transmission.

Figure 5:
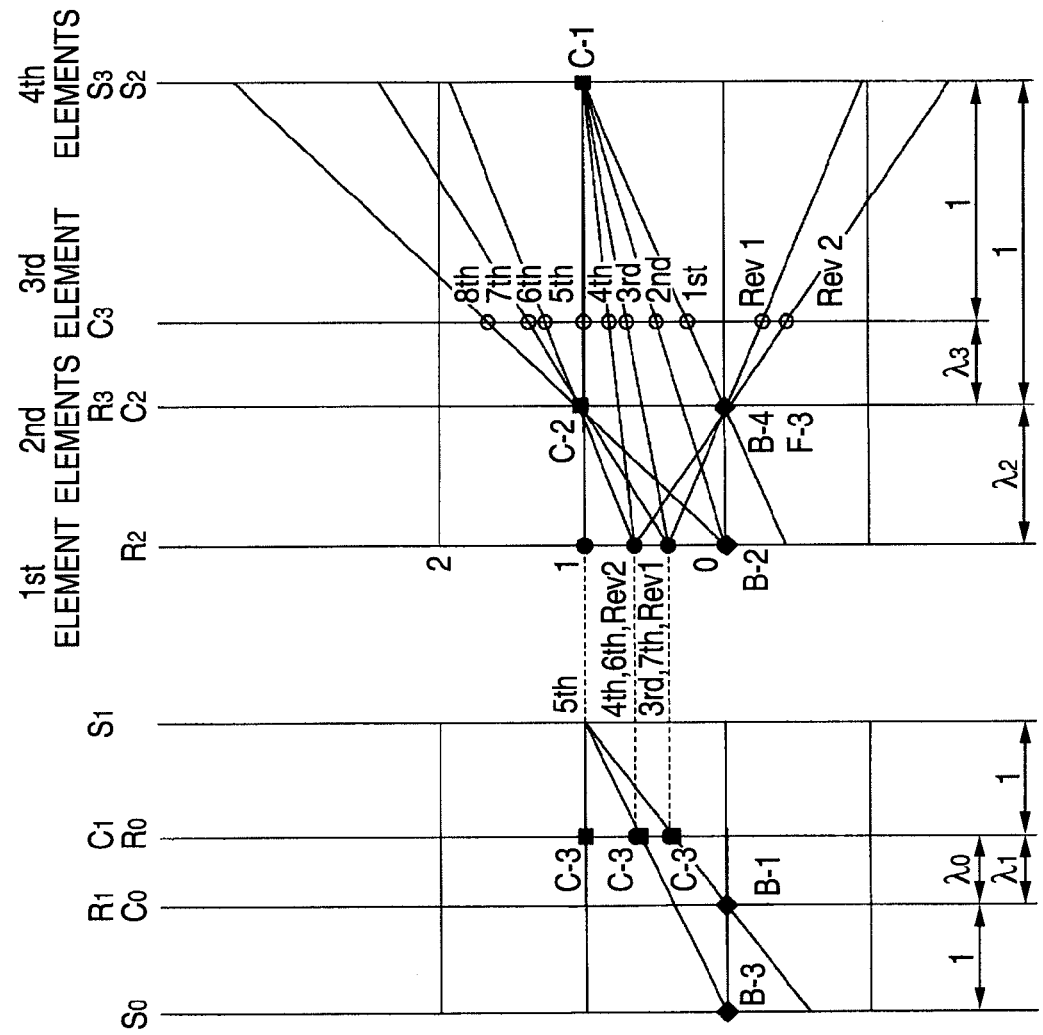
FIG. 5 is a speed diagram showing gear ratios of respective elements of planetary gear trains at each shift stage in the second embodiment.

The rotation speed ratios of the sun gears S0-S3, the carriers C0-C3, and the ring gears R0-R3 at each shift stage are as shown in a speed diagram of FIG. 5 in which the rotation speed of the input shaft 14 is assumed to be "1." Therefore, also in the second embodiment, the rotation speed ratios of the fourth carrier C3 as the third element, that is, the gear ratios, at the respective shift stages are arranged at proper intervals without large variations. As a result, gear ratios of forward eight stages and backward two stages can be realized which are separated from each other properly. Furthermore, the step ratios, each of which is a rate of increase of the gear ratio when the shift stage is raised by one stage, are as shown in FIG. 2 as in the case of the first embodiment.

Therefore, the automatic transmission 10 according to the second embodiment can provide the same workings/advantages (1) and (2) as that according to the first embodiment does.

Embodiment 3

Next, an automatic transmission according to a third embodiment of the invention will be described with reference to FIGS. 6-8. The third embodiment is the same in configuration as the first embodiment except that the former is not equipped with the third control clutch. Therefore, in the following, features that are different than in the first embodiment will be described mainly and redundant descriptions will be avoided by giving members etc. having the same members etc. in the first embodiment the same reference symbols as the latter.

Figure 6:
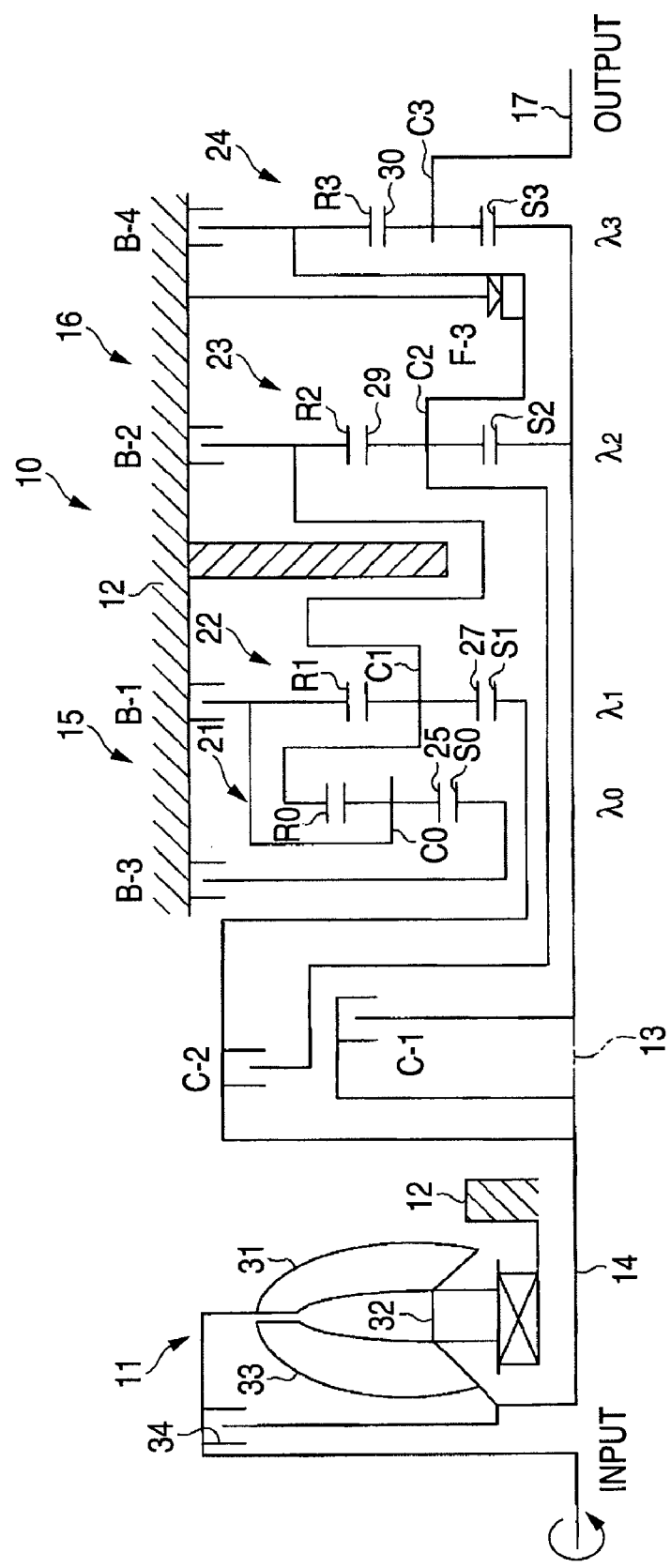
FIG. 6 is a skeleton view of an automatic transmission according to a third embodiment.

In the automatic transmission 10 according to this embodiment, as shown in FIG. 6, the second sun gear S1 of the second planetary gear mechanism 22 of the reduction double planetary gear train 15 is connected to the input shaft 14, whereby rotation of the input shaft 14 is transmitted to the second sun gear S1. As shown in FIG. 6, in the other points, the members of the automatic transmission 10 according to the third embodiment are the same as those of the automatic transmission 10 according to the first embodiment.

In the third embodiment, since the third control clutch C-3 is not provided, the manners of activation at each shift stage are different than in the first embodiment in that the first sun gear S0 rotates at the forward first shift stage, the forward second shift stage, the forward eighth shift stage, the backward first shift stage, and the backward second shift stage.

More specifically, at each of the above shift stages, the third ring gear R2 rotates in the reverse direction as the third sun gear S2 rotates. And the second carrier C1 and the first ring gear R0 which are linked to the third ring gear R2 also rotate in the reverse direction. Therefore, where the third control clutch C-3 is not provided, rotation of the input shaft 14 is transmitted to the second ring gear R1 and the first carrier C0 which is linked to the second ring gear R1 via the second pinion 27 which is supported by the second carrier C1, whereby the first carrier C0 rotates. As a result, the first sun gear S0 rotates which is in mesh with the first pinion 25 which is supported by the first carrier C0. In this case, the rotation speed of the first sun gear S0 corresponds to the difference between rotation speeds of the first carrier C0 and the first ring gear R0. Therefore, the first sun gear S0 rotates fastest at the forward first shift stage.

Figure 8:
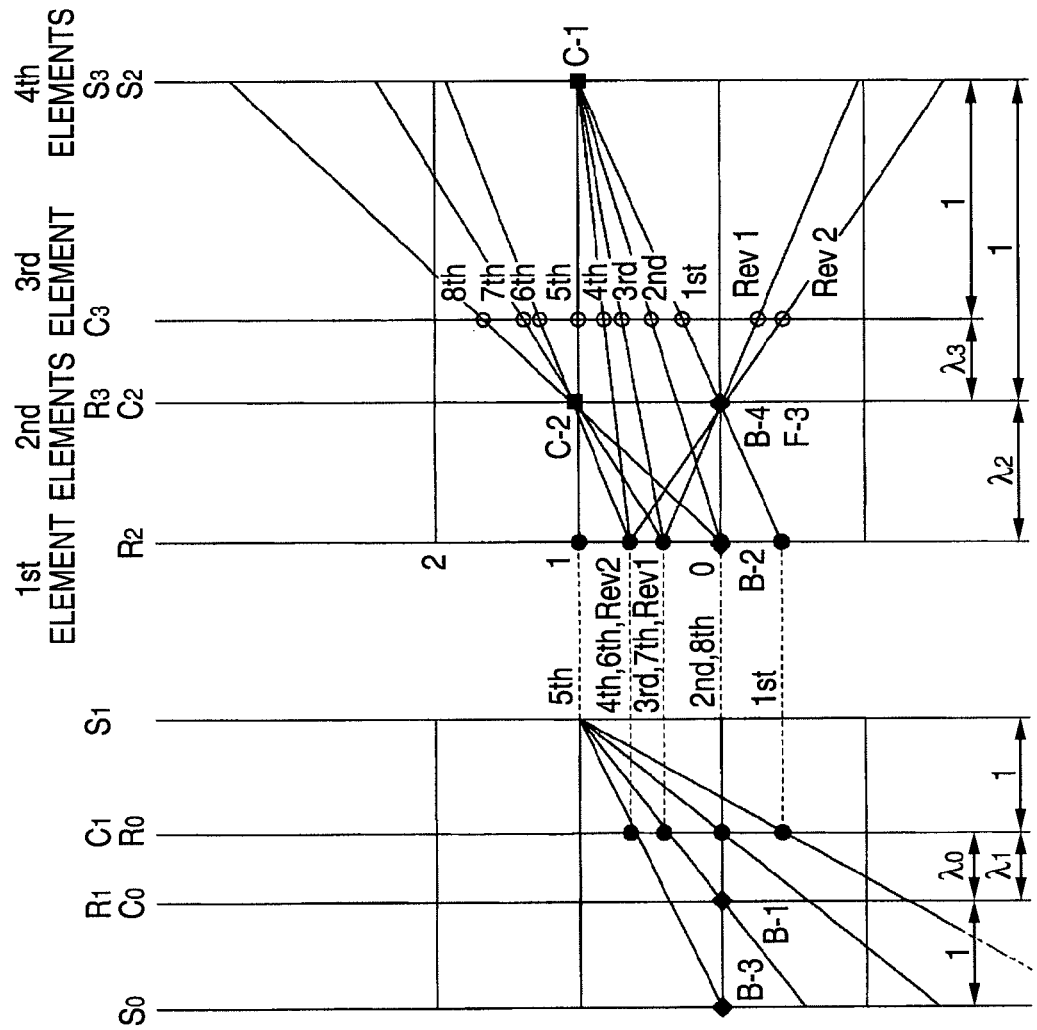
FIG. 8 is a speed diagram showing gear ratios of respective elements of planetary gear trains at each shift stage in the third embodiment.

The rotation speed ratios of the sun gears S0-S3, the carriers C0-C3, and the ring gears R0-R3 at each shift stage are as shown in a speed diagram of FIG. 8 in which the rotation speed of the input shaft 14 is assumed to be "1." Therefore, also in the third embodiment, the rotation speed ratios of the fourth carrier C3 as the third element, that is, the gear ratios, at the respective shift stages are arranged at proper intervals without large variations. As a result, gear ratios of forward eight stages and backward two stages can be realized which are separated from each other properly. Furthermore, the step ratios, each of which is a rate of increase of the gear ratio when the shift stage is raised by one stage, are as shown in FIG. 7 as in the case of the first embodiment.

Therefore, the automatic transmission 10 according to the third embodiment can provide the same workings/advantage (1) as that according to the first embodiment does.

The above-described embodiments may be modified into other embodiments (examples) described below.

Figure 9:
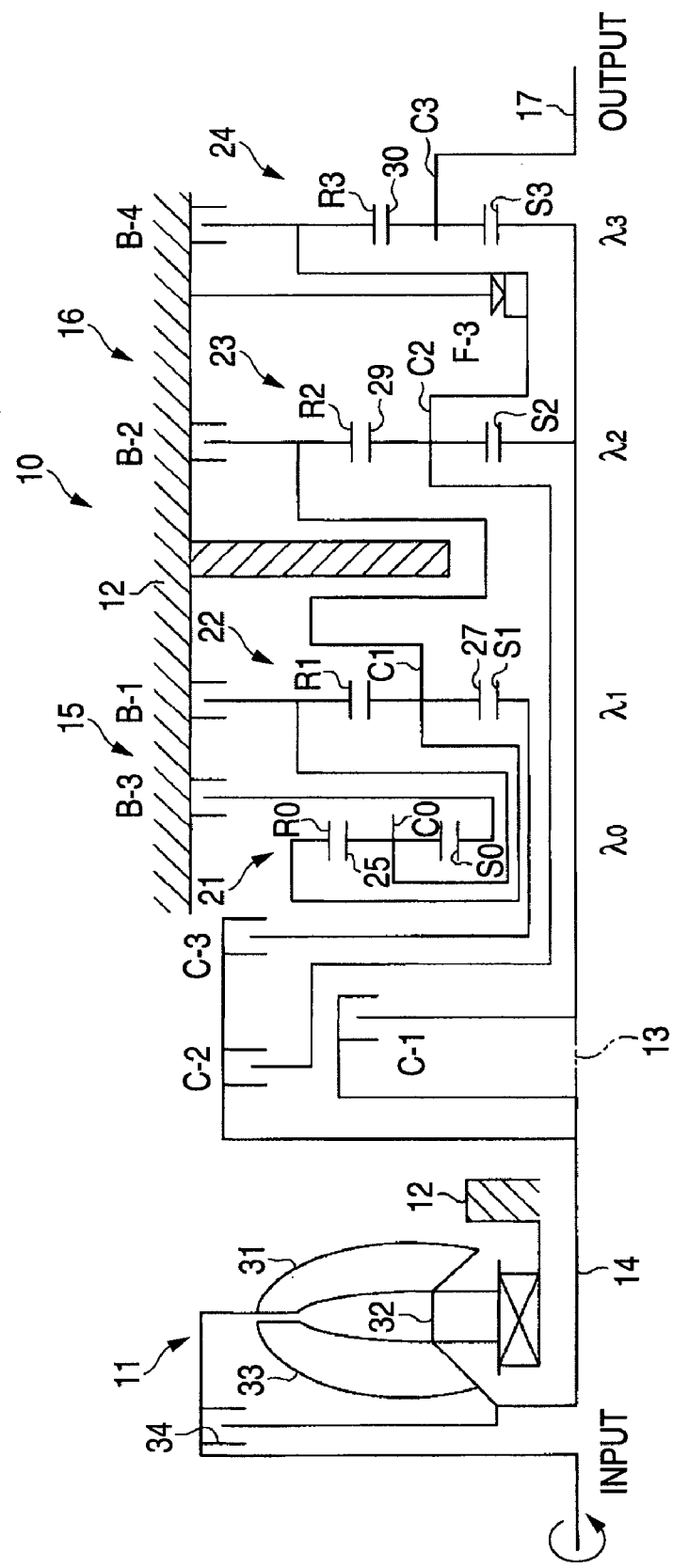
FIG. 9 is a skeleton diagram of an automatic transmission according to another embodiment.

As shown in FIG. 9, in the first embodiment, the extension form of a hub which extends for linking or cooperation of the sun gears S0 and S1, the carriers C0 and C1, and the ring gears R0 and R1 of the first planetary gear mechanism 21 and the second planetary gear mechanism 22 of the reduction double planetary gear train 15 to or with the other elements may be modified. The automatic transmission 10 shown in FIG. 9 can more properly accommodate a case that the interval between the third control brake B-3 and the first control brake B-1 is small than that according to the first embodiment shown in FIG. 1.

Figure 10:
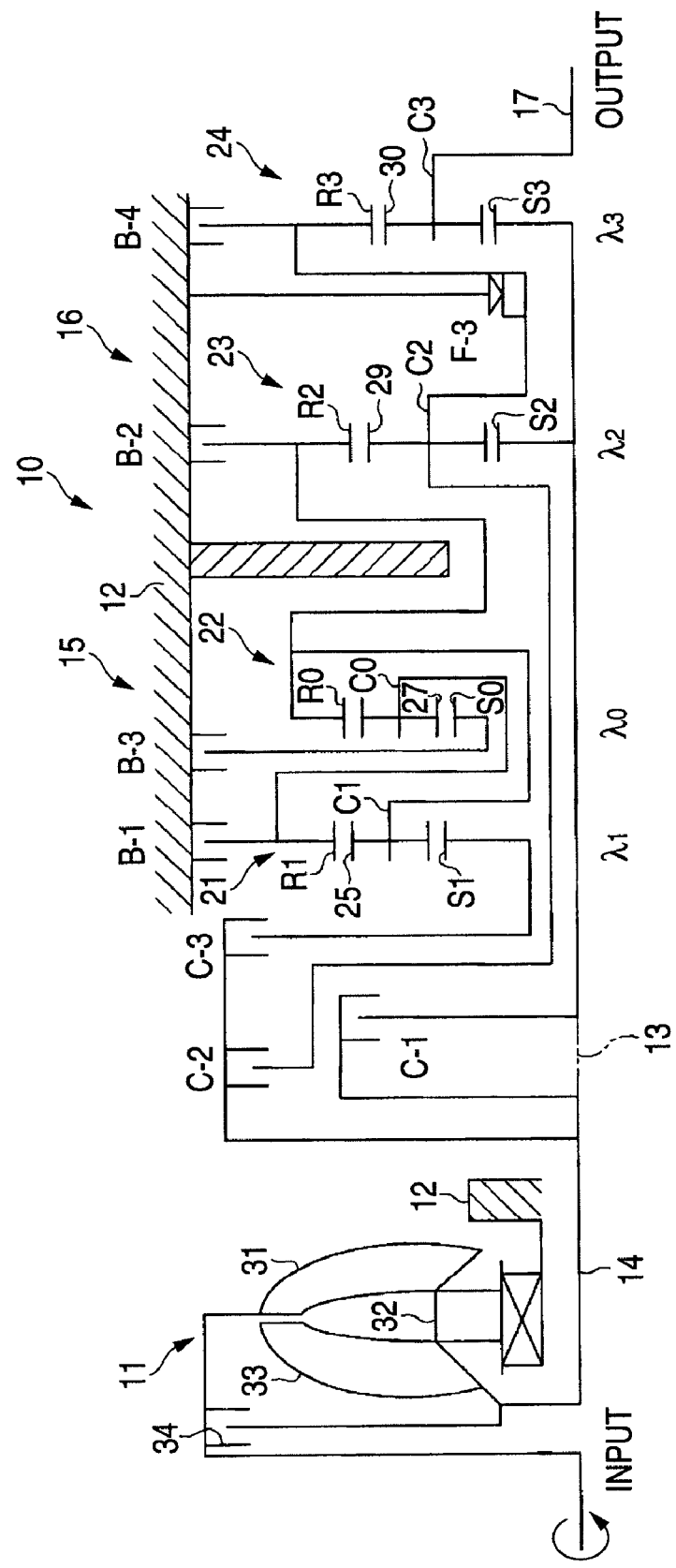
FIG. 10 is a skeleton diagram of an automatic transmission according to another embodiment.
Figure 11:
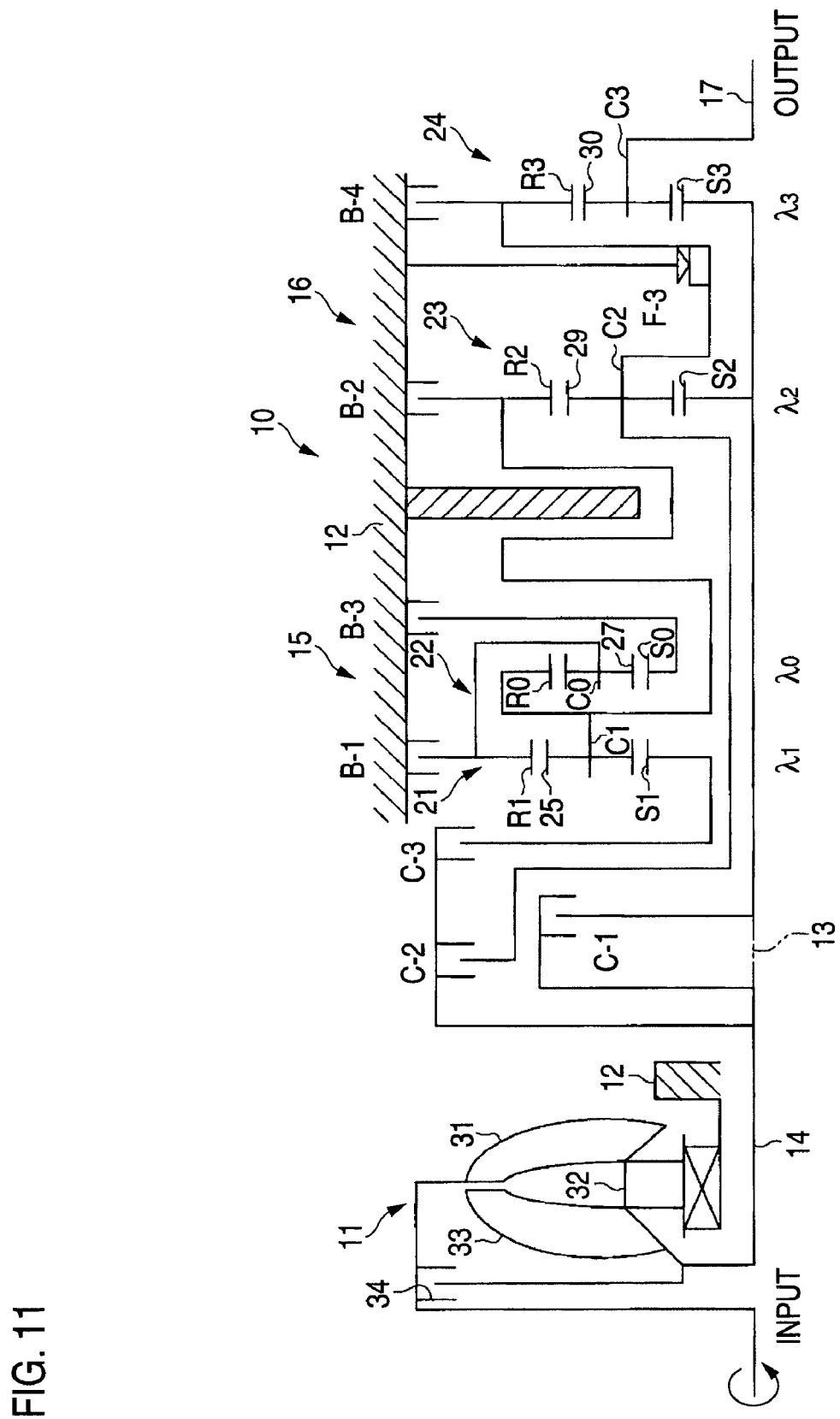
FIG. 11 is a skeleton diagram of an automatic transmission according to another embodiment.

As shown in FIGS. 10 and 11, the first embodiment may be modified in such a manner that the positions of the first planetary gear mechanism 21 and the second planetary gear mechanism 22 of the reduction double planetary gear train 15 in the front-rear direction are reversed and that the extension form of a hub which extends for linking or cooperation of the sun gears S0 and S1, the carriers C0 and C1, and the ring gears R0 and R1 to or with the other elements is modified. Unlike the automatic transmission 10 according to the first embodiment shown in FIG. 1, the automatic transmissions 10 shown in FIGS. 10 and 11 can properly accommodate a case that the positions of the third control brake B-3 and the first control brake B-1 in the front-rear direction are reversed with respect to the transmission case 12. Furthermore, the automatic transmission 10 shown in FIG. 10 can properly accommodate a case that the interval between the third control brake B-3 and the first control brake B-1 is small.

Figure 12:
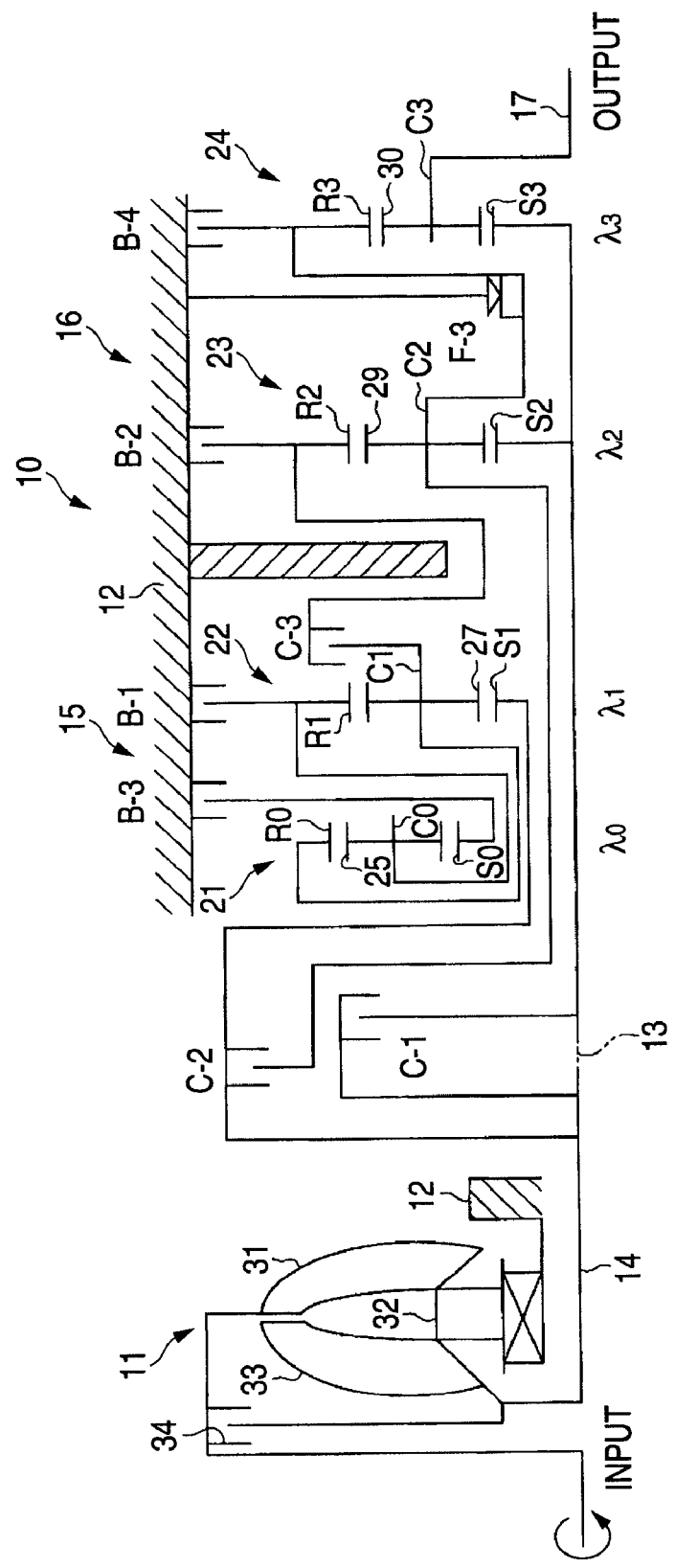
FIG. 12 is a skeleton diagram of an automatic transmission according to still another embodiment.

As shown in FIG. 12, in the second embodiment, the extension form of a hub which extends for linking or cooperation of the sun gears S0 and S1, the carriers C0 and C1, and the ring gears R0 and R1 of the first planetary gear mechanism 21 and the second planetary gear mechanism 22 of the reduction double planetary gear train 15 to or with the other elements may be modified. The automatic transmission 10 shown in FIG. 12 can more properly accommodate a case that the interval between the third control brake B-3 and the first control brake B-1 is small than that according to the second embodiment shown in FIG. 4.

Figure 13:
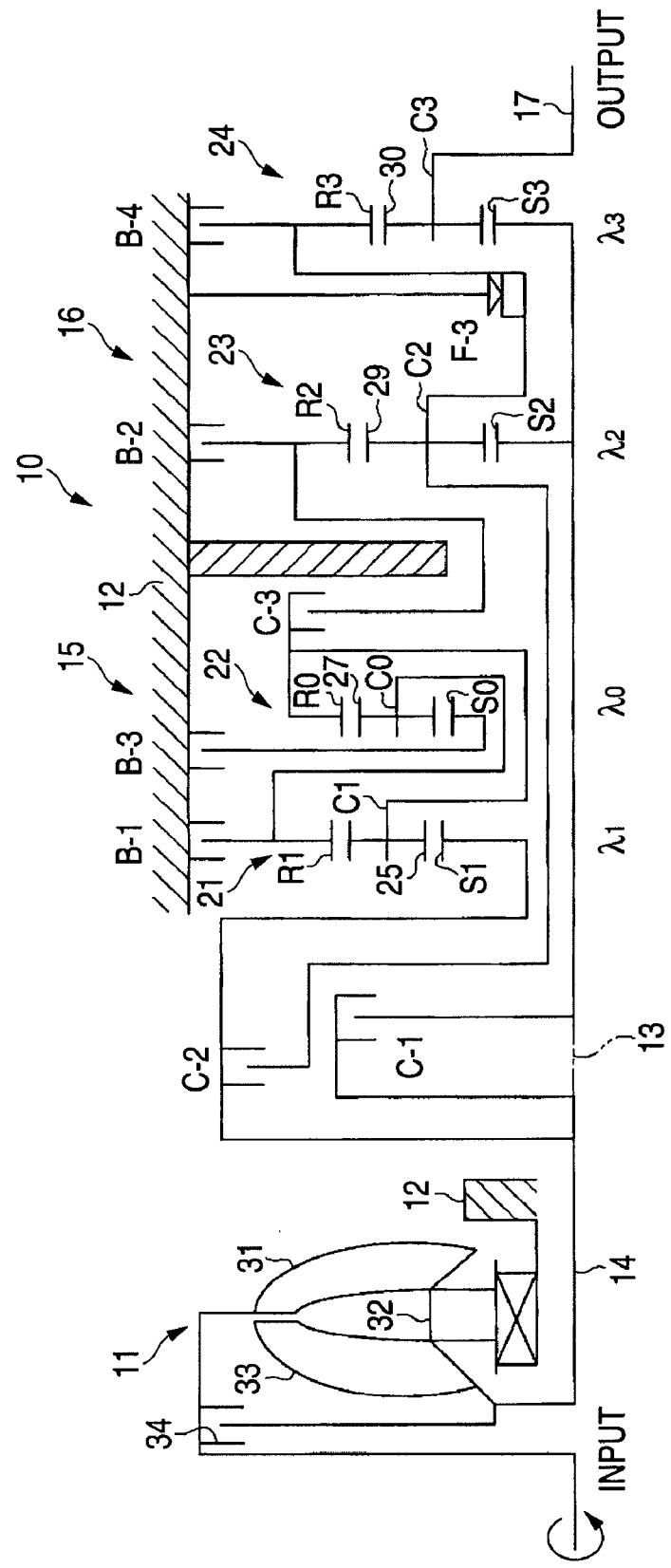
FIG. 13 is a skeleton diagram of an automatic transmission according to another embodiment.
Figure 14:
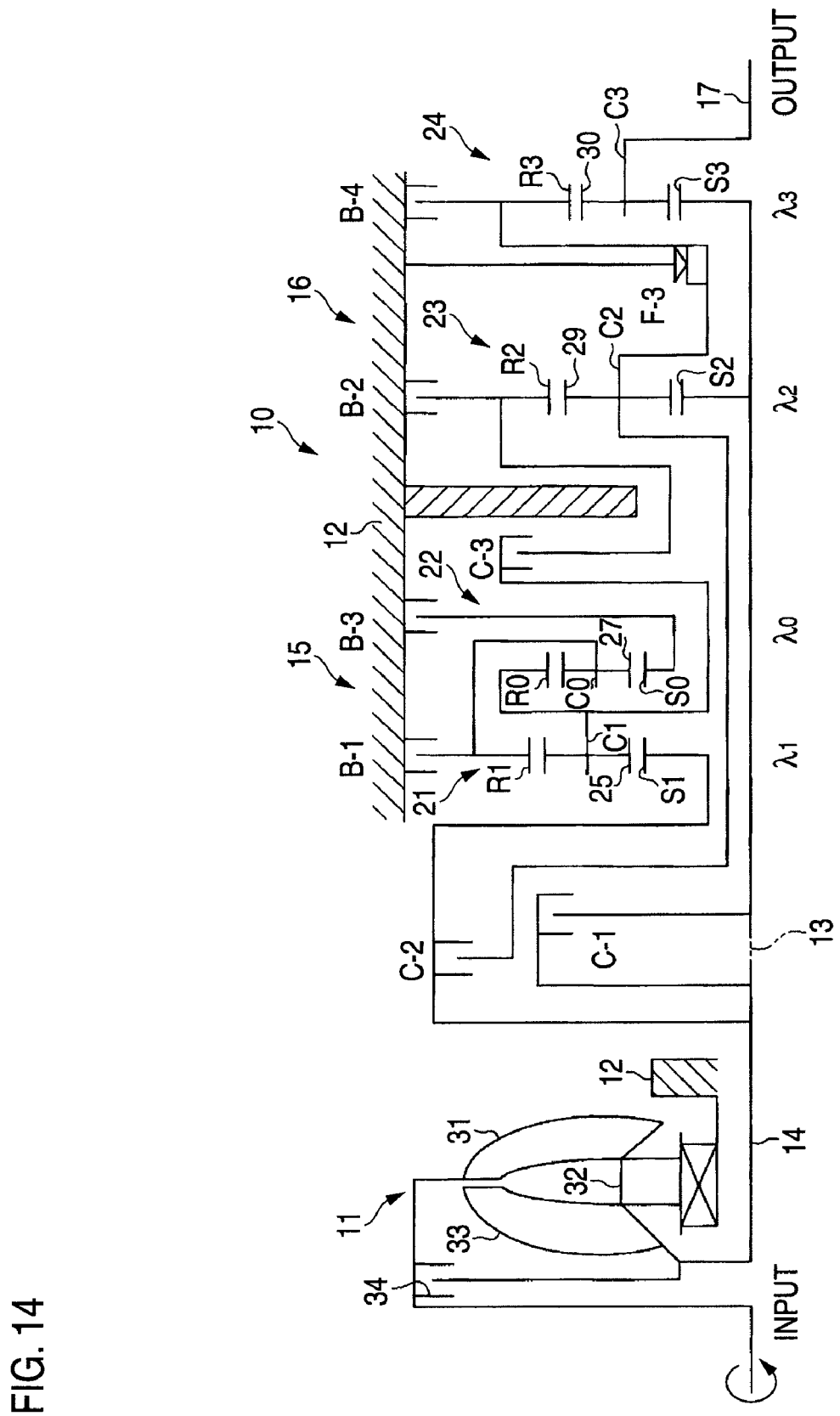
FIG. 14 is a skeleton diagram of an automatic transmission according to another embodiment.

As shown in FIGS. 13 and 14, the second embodiment may be modified in such a manner that the positions of the first planetary gear mechanism 21 and the second planetary gear mechanism 22 of the reduction double planetary gear train 15 in the front-rear direction are reversed and that the extension form of a hub which extends for linking or cooperation of the sun gears S0 and S1, the carriers C0 and C1, and the ring gears R0 and R1 to or with the other elements is modified. Unlike the automatic transmission 10 according to the second embodiment shown in FIG. 4, the automatic transmissions 10 shown in FIGS. 13 and 14 can properly accommodate a case that the positions of the third control brake B-3 and the first control brake B-1 in the front-rear direction are reversed with respect to the transmission case 12. Furthermore, the automatic transmission 10 shown in FIG. 13 can properly accommodate a case that the interval between the third control brake B-3 and the first control brake B-1 is small.

Figure 15:
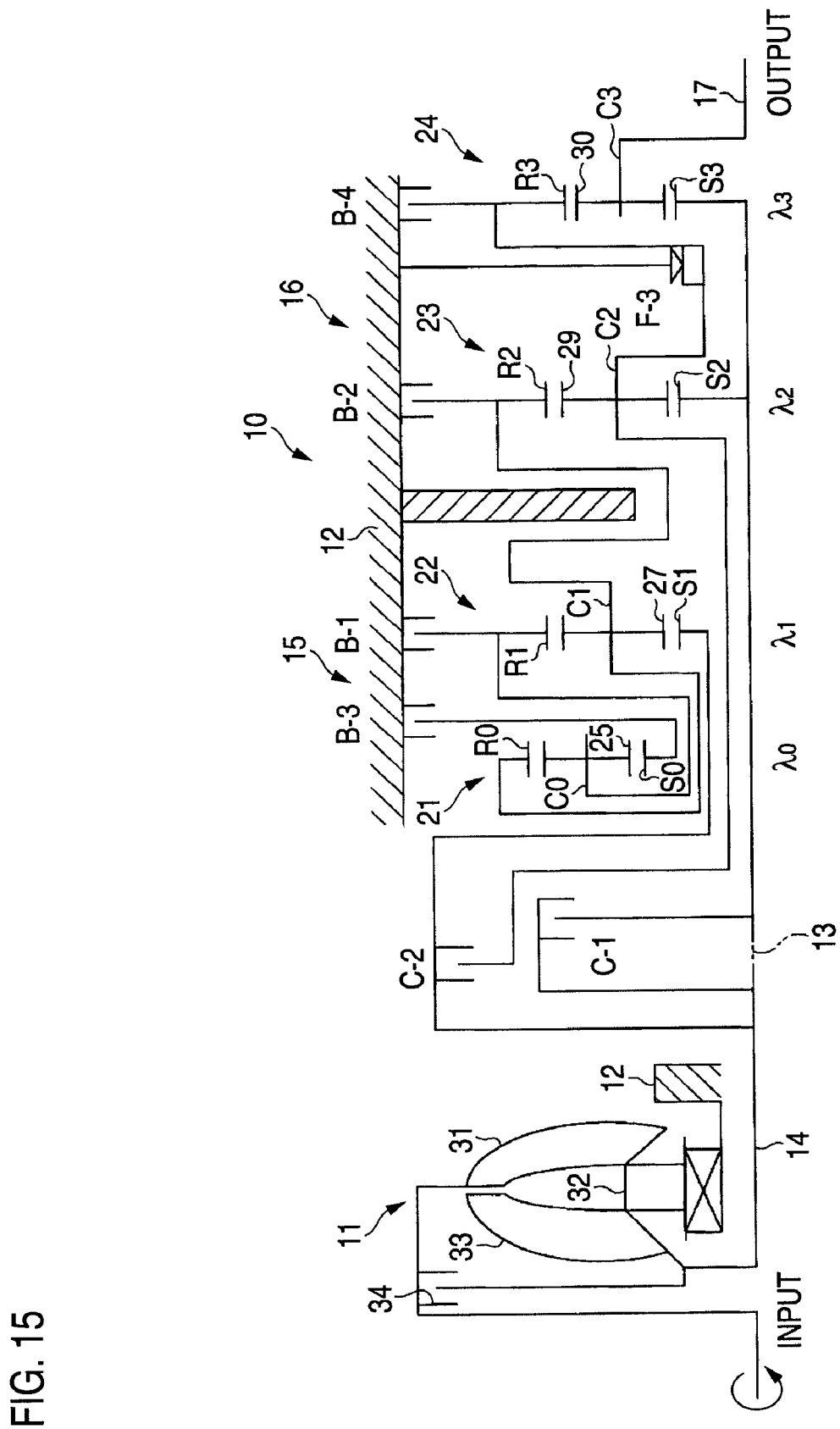
FIG. 15 is a skeleton diagram of an automatic transmission according to yet another embodiment.

As shown in FIG. 15, in the third embodiment, the extension form of a hub which extends for linking or cooperation of the sun gears S0 and S1, the carriers C0 and C1, and the ring gears R0 and R1 of the first planetary gear mechanism 21 and the second planetary gear mechanism 22 of the reduction double planetary gear train 15 to or with the other elements may be modified. The automatic transmission 10 shown in FIG. 15 can more properly accommodate a case that the interval between the third control brake B-3 and the first control brake B-1 is small than that according to the third embodiment shown in FIG. 6.

Figure 16:
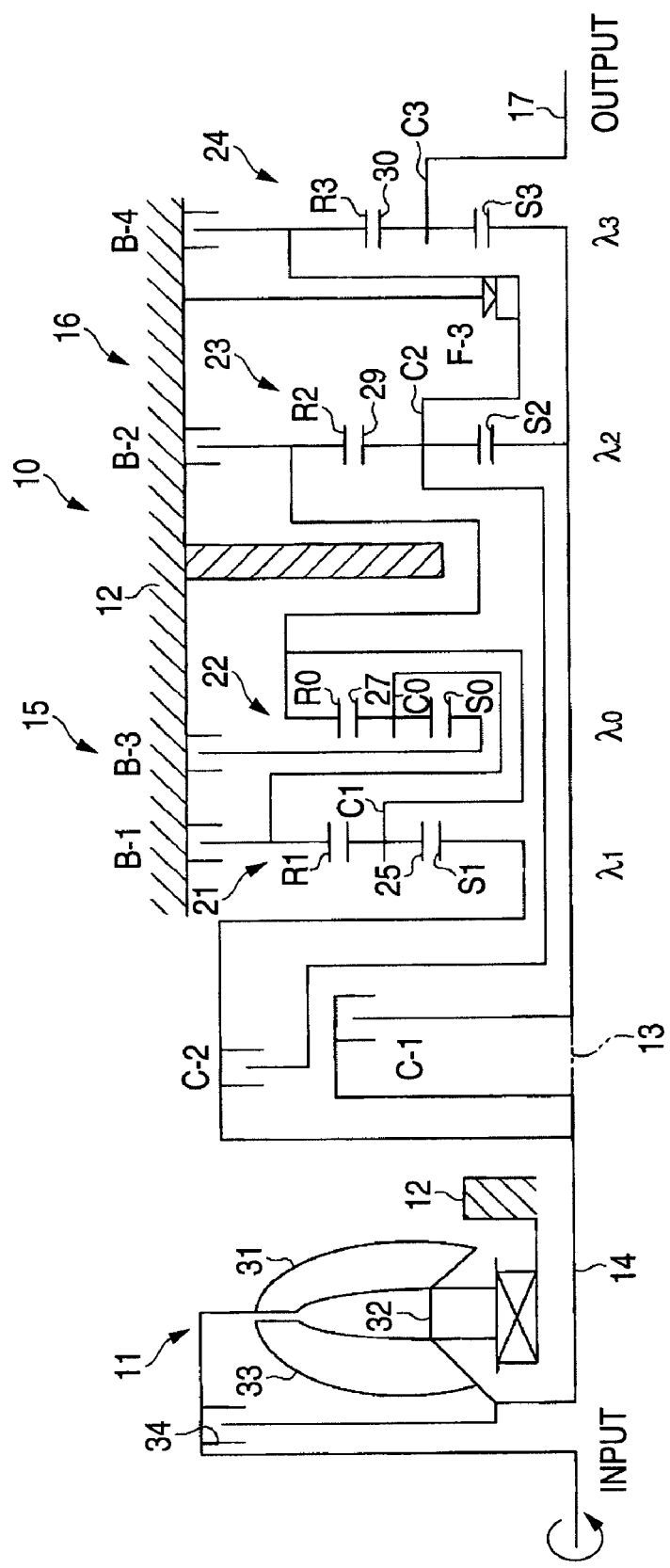
FIG. 16 is a skeleton diagram of an automatic transmission according to another embodiment.
Figure 17:
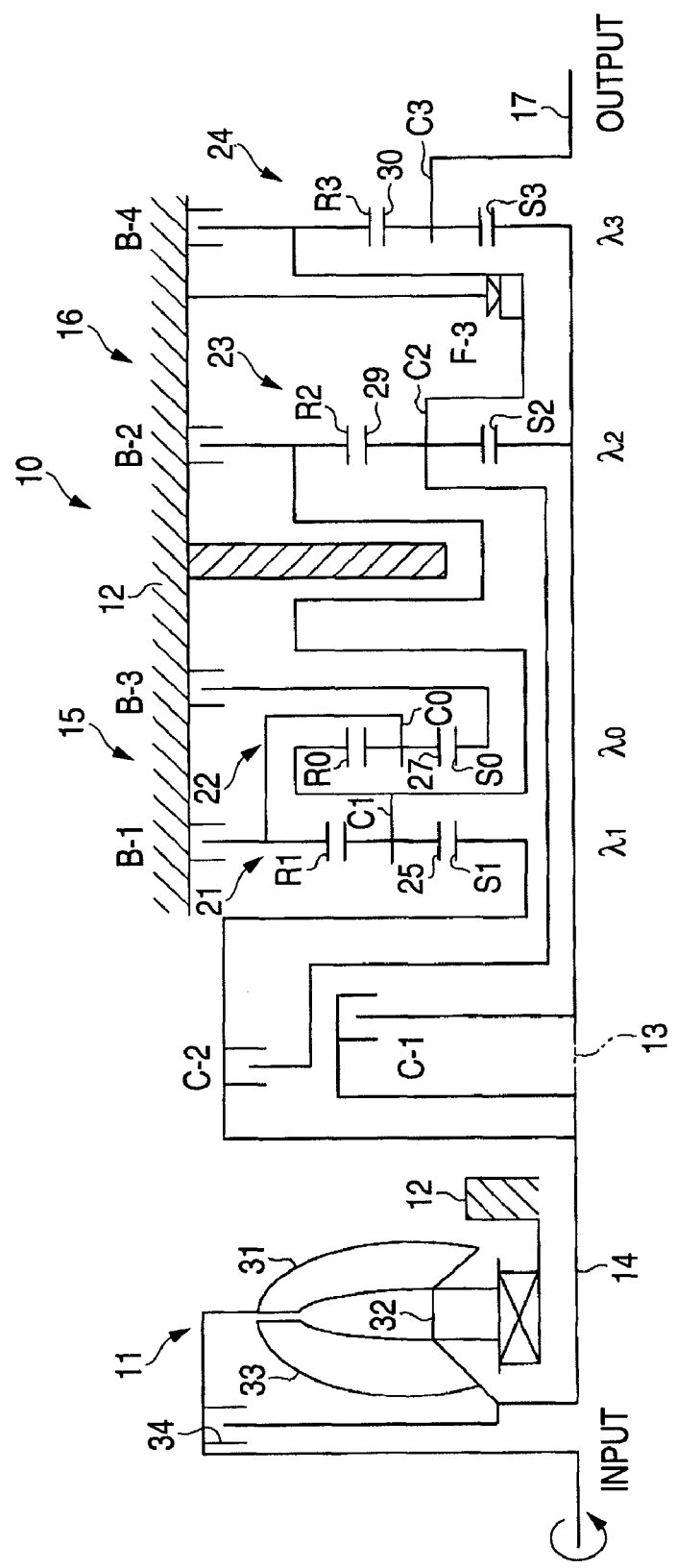
FIG. 17 is a skeleton diagram of an automatic transmission according to a further embodiment.

As shown in FIGS. 16 and 17, the third embodiment may be modified in such a manner that the positions of the first planetary gear mechanism 21 and the second planetary gear mechanism 22 of the reduction double planetary gear train 15 in the front-rear direction are reversed and that the extension form of a hub which extends for linking or cooperation of the sun gears S0 and S1, the carriers C0 and C1, and the ring gears R0 and R1 to or with the other elements is modified. Unlike the automatic transmission 10 according to the third embodiment shown in FIG. 6, the automatic transmissions 10 shown in FIGS. 16 and 17 can properly accommodate a case that the positions of the third control brake B-3 and the first control brake B-1 in the front-rear direction are reversed with respect to the transmission case 12. Furthermore, the automatic transmission 10 shown in FIG. 16 can properly accommodate a case that the interval between the third control brake B-3 and the first control brake B-1 is small.

In each of the above embodiments, the numbers of teeth of the sun gears S0-S3 and the ring gears R0-R3 can be set arbitrarily in the respective planetary gear mechanisms 21 to 24 as long as the gear teeth number ratios $\lambda 0$, $\lambda 1$, $\lambda 2$, and $\lambda 3$ shown in the activation table of FIG. 2 or 7 are satisfied.

In the second embodiment shown in FIG. 4 and other embodiments shown in FIGS. 12-14, the specific location of the third control clutch C-3 can be determined arbitrarily as long as it can link the second ring gear R1 and the third ring gear R2 to each other disengageably.

In the first embodiment shown in FIG. 1, the second embodiment shown in FIG. 4, and other embodiments shown in FIGS. 9-14, the engaged states, indicated by the black circles in the activation table of FIG. 2, of the third control clutch C-3 and the first control brake B-1 may be deactivated states.

The invention claimed is:

1. An automatic transmission including:
a reduction double planetary gear train having a first planetary gear mechanism and a second planetary gear mechanism both being of a single pinion type and a shifting double planetary gear train having a third planetary gear mechanism and a fourth planetary gear mechanism both being of a single pinion type, the automatic transmission further characterized in:
that in the reduction double planetary gear train, the first planetary gear mechanism comprises a first sun gear, a first carrier which supports a first pinion being in mesh with the first sun gear, and a first ring gear being in mesh with the first pinion, the second planetary gear mechanism comprises a second sun gear, a second carrier which supports a second pinion being in mesh with the second sun gear and is connected to the first ring gear, and a second ring gear which is in mesh with the second pinion, the second sun gear is connected to an input shaft in a power-transmissible manner, the first sun gear is connected to a third control brake, and the second ring gear and the first carrier are connected to each other and connected to a first control brake;
that in the shifting double planetary gear train, the third planetary gear mechanism comprises a third sun gear, a third carrier which supports a third pinion being in mesh with the third sun gear, and a third ring gear which is in mesh with the third pinion and is connected to the second carrier in a power-transmissible manner, the fourth planetary gear mechanism comprises a fourth sun gear, a fourth carrier which supports a fourth pinion being in mesh with the fourth sun gear, and a fourth ring gear which is in mesh with the fourth pinion and is connected to the third carrier, the third sun gear and the fourth sun gear are connected to each other and connected to the input shaft disengageably by a first control clutch, the third ring gear and the fourth ring gear are connected to a second control brake and a fourth control brake, respectively, the third carrier is connected to the input shaft disengageably by a second control clutch, and the fourth carrier is connected to an output shaft; and
that rotation of the first ring gear and the second carrier is transmitted to the third ring gear.

2. The automatic transmission according to claim 1, further including a third control clutch for preventing high-speed rotation of the first sun gear.

3. The automatic transmission according to claim 2, characterized in that the third control clutch selectively connects the input shaft to the second sun gear.

4. The automatic transmission according to claim 2, characterized in that the third control clutch selectively connects the first ring gear and the second carrier to the third ring gear.

* * * * *